(12) United States Patent
Dowlatkhah et al.

(10) Patent No.: US 11,032,327 B2
(45) Date of Patent: *Jun. 8, 2021

(54) METHOD AND APPARATUS FOR FACILITATING ESTABLISHING AND MAINTAINING COMMUNICATION SERVICES

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/574,761

(22) Filed: Sep. 18, 2019

(65) Prior Publication Data

US 2020/0014731 A1 Jan. 9, 2020

Related U.S. Application Data

(63) Continuation of application No. 15/950,872, filed on Apr. 11, 2018, now Pat. No. 10,469,540, which is a
(Continued)

(51) Int. Cl.
*G06F 15/16* (2006.01)
*H04L 29/06* (2006.01)
(Continued)

(52) U.S. Cl.
CPC ...... *H04L 65/1046* (2013.01); *H04L 65/1016* (2013.01); *H04L 65/1069* (2013.01);
(Continued)

(58) Field of Classification Search
CPC ............ H04L 41/0893; H04L 41/5022; H04L 65/1016; H04L 65/1046; H04L 65/1069;
(Continued)

(56) References Cited

U.S. PATENT DOCUMENTS 6,651,105 B1 * 11/2003 Bhagwat ................ H04L 29/06
709/227
7,356,001 B1 * 4/2008 Jones ..................... H04W 84/02
370/331
(Continued)

FOREIGN PATENT DOCUMENTS

KR 10-2012-0001361 1/2012

OTHER PUBLICATIONS

"Continuity of Service and Mobility", Inovacao E Sistemas, 2014, pp. 1-20.
(Continued)

*Primary Examiner* — Moustafa M Meky
*Assistant Examiner* — Thorne E Waugh
(74) *Attorney, Agent, or Firm* — Guntin & Gust, PLC; Kenneth Kwan

(57) ABSTRACT

Aspects of the subject disclosure may include, for example, providing radio access information to a first server of an IP multimedia subsystem network to cause the first server to establish an interface between the first server and a second server for providing the radio access information to the second server, where the interface does not utilize an S14 interface, and where the providing of the radio access information to the second server causes the second server to discover access networks in proximity to the communication device and to manage connections to the access networks. Other embodiments are disclosed.

20 Claims, 5 Drawing Sheets

Related U.S. Application Data continuation of application No. 14/315,984, filed on Jun. 26, 2014, now Pat. No. 9,973,542.

(51) Int. Cl.
*H04W 36/00* (2009.01)
*H04W 48/14* (2009.01)
*H04W 92/16* (2009.01)
*H04L 12/24* (2006.01)

(52) U.S. Cl.
CPC ..... *H04W 36/0033* (2013.01); *H04L 41/0893* (2013.01); *H04L 41/5022* (2013.01); *H04W 48/14* (2013.01); *H04W 92/16* (2013.01)

(58) Field of Classification Search
CPC .. H04W 36/0033; H04W 48/14; H04W 92/16
USPC .......................................................... 709/203
See application file for complete search history.

(56) References Cited

U.S. PATENT DOCUMENTS

| | | | |
|---|---|---|---|
| 7,502,626 B1* | 3/2009 | Lemilainen | H04M 1/725 370/351 |
| 7,729,366 B2* | 6/2010 | Mok | H04L 45/00 370/401 |
| 7,944,948 B2* | 5/2011 | Chow | H04M 7/0069 370/485 |
| 7,979,671 B2* | 7/2011 | Aviles | G06F 12/0813 711/216 |
| 8,150,951 B2* | 4/2012 | O'Rourke | H04L 12/2859 709/223 |
| 8,185,152 B1 | 5/2012 | Goldner | |
| 8,265,090 B2 | 9/2012 | Cai et al. | |
| 8,516,529 B2 | 8/2013 | Lajoie et al. | |
| 8,605,683 B2 | 12/2013 | Garcia Martin et al. | |
| 8,625,582 B2 | 1/2014 | Hegde et al. | |
| 8,644,190 B2 | 2/2014 | Sachs et al. | |
| 8,718,014 B2 | 5/2014 | Choi et al. | |
| 8,787,875 B2* | 7/2014 | Ahmed | H04L 12/66 455/410 |
| 8,874,710 B2* | 10/2014 | Reunamaki | H04L 67/16 709/223 |
| 8,897,344 B2 | 11/2014 | Maguire et al. | |
| 9,107,112 B2* | 8/2015 | Zisimopoulos | A63F 13/75 |
| 9,351,193 B2 | 5/2016 | Raleigh et al. | |
| 9,356,865 B2* | 5/2016 | Gleixner | H04L 65/103 |
| 9,374,230 B2* | 6/2016 | Wang | H04W 4/023 |
| 9,380,494 B2* | 6/2016 | Sirotkin | H04W 72/0486 |
| 9,510,256 B2 | 11/2016 | Krishna et al. | |
| 9,787,527 B1* | 10/2017 | Goel | H04W 48/14 |
| 9,832,795 B2* | 11/2017 | Perez Martinez | H04L 67/02 |
| 10,051,533 B2* | 8/2018 | Fitzpatrick | H04W 36/00837 |
| 2005/0271011 A1* | 12/2005 | Alemany | H04W 36/28 370/331 |
| 2006/0291487 A1 | 12/2006 | Naqvi et al. | |
| 2006/0294245 A1 | 12/2006 | Raguparan et al. | |
| 2008/0305751 A1* | 12/2008 | Naumann | H04W 4/10 455/90.2 |
| 2011/0188376 A1 | 8/2011 | Stupar et al. | |
| 2012/0208502 A1 | 8/2012 | Perras | |
| 2012/0259985 A1 | 10/2012 | Koskela et al. | |
| 2013/0028179 A1 | 1/2013 | Sedlacek et al. | |
| 2013/0041938 A1* | 2/2013 | Lin | H04N 21/4126 709/203 |
| 2013/0107799 A1 | 5/2013 | Karlsson et al. | |
| 2013/0142042 A1 | 6/2013 | Garcia Martin et al. | |
| 2013/0163424 A1 | 6/2013 | Goerke et al. | |
| 2013/0246052 A1 | 9/2013 | Tanaka et al. | |
| 2013/0308445 A1 | 11/2013 | Xiang et al. | |
| 2013/0310030 A1 | 11/2013 | Ventimiglia et al. | |
| 2013/0322300 A1 | 12/2013 | Landais et al. | |
| 2014/0029420 A1 | 1/2014 | Jeong et al. | |
| 2014/0038628 A1 | 2/2014 | Qiang et al. | |
| 2014/0064094 A1 | 3/2014 | Shaikh | |
| 2014/0092731 A1 | 4/2014 | Gupta | |
| 2014/0106743 A1 | 4/2014 | Ferraro Esparza et al. | |
| 2014/0112282 A1 | 4/2014 | Wijting et al. | |
| 2015/0043429 A1 | 2/2015 | Kim et al. | |
| 2015/0063298 A1 | 3/2015 | Keller et al. | |
| 2015/0117320 A1* | 4/2015 | Wang | H04L 12/1407 370/329 |
| 2015/0201371 A1* | 7/2015 | Tamura | H04W 8/04 370/259 |
| 2018/0132154 A1* | 5/2018 | Sirotkin | H04W 8/005 |
| 2018/0234467 A1 | 8/2018 | Dowlatkhah et al. | |

OTHER PUBLICATIONS

Corici, Marius, "Access Network Discovery and Selection in the Future Broadband Wireless Environment", Competence Center NGNI, www.openEPC.net, Oct. 14, 2010, pp. 1-27.

Ghadialy, "IP Flow Mobility and Seamless Offload (IFOM)", http://blog.3g4g.co.uk/2010/11/ip-flow-mobility-and-seamless-offload.html, Nov. 2010, pp. 1-11.

"Architecture enhancements for non-3GPP accesses (3GPP TS 23.402 version 10.4.0 Release 10)", ETSI TS 123 402 V10.4.0 (Jun. 2011), Universal Mobile Telecommunications System (UMTS); LTE; Ref: RTS/TSGS-0223402va40, http://www.etsi.org/deliver/etsi_ts/123400_123499/123402/10.04.00_60/ts_ 123402v100400p.pdf, Fig. 4.2.3-4, Jun. 2011, pp. 25-31.

Yeh, et al., "IP Multimedia Subsystems in 3GPP and 3GPP2: Overview and Scability Issues", 2008, pp. 138-145.

Zhang, et al., "International Journal of Agent Technologies and Systems (IJATS)", vol. 6, Issue 1, Network Based IP Flow Mobility, Introduction, Background, Evaluation, and Discussion and Conclusion, Jan. 1, 2014, 33 pages.

* cited by examiner

100 ent ID (e.g., user equipment (UE)) or mobile communication device. The UE 101 can be various types of mobile devices such as a smartphone, a tablet, a laptop computer, a PDA, a vehicle communication system (e.g., that communicates with a user's mobile phone) and so forth. The UE 101 can communicate with various access networks utilizing various communication protocols. For example, the UE 101 can access one or more wireless networks, such as a cellular network (e.g., LTE) and/or a WiFi network.

METHOD AND APPARATUS FOR FACILITATING ESTABLISHING AND MAINTAINING COMMUNICATION SERVICES

CROSS REFERENCE TO RELATED APPLICATIONS

This application is a continuation of U.S. patent application Ser. No. 15/950,872 filed on Apr. 11, 2018, which is a continuation of U.S. application Ser. No. 14/315,984 (now U.S. Pat. No. 9,973,542) filed Jun. 26, 2014. The contents of each of the foregoing is/are hereby incorporated by reference into this application as if set forth herein in full.

FIELD OF THE DISCLOSURE

The subject disclosure relates to a method and apparatus for facilitating establishing and maintaining communication services.

BACKGROUND

Users of end user devices often desire access to a wide variety of communication services even during high mobility of the end user devices. Service providers can employ a number of different types of access networks that utilize different communication protocols for delivering communication services.

BRIEF DESCRIPTION OF THE DRAWINGS

Reference will now be made to the accompanying drawings, which are not necessarily drawn to scale, and wherein.

DETAILED DESCRIPTION

Figure 1:
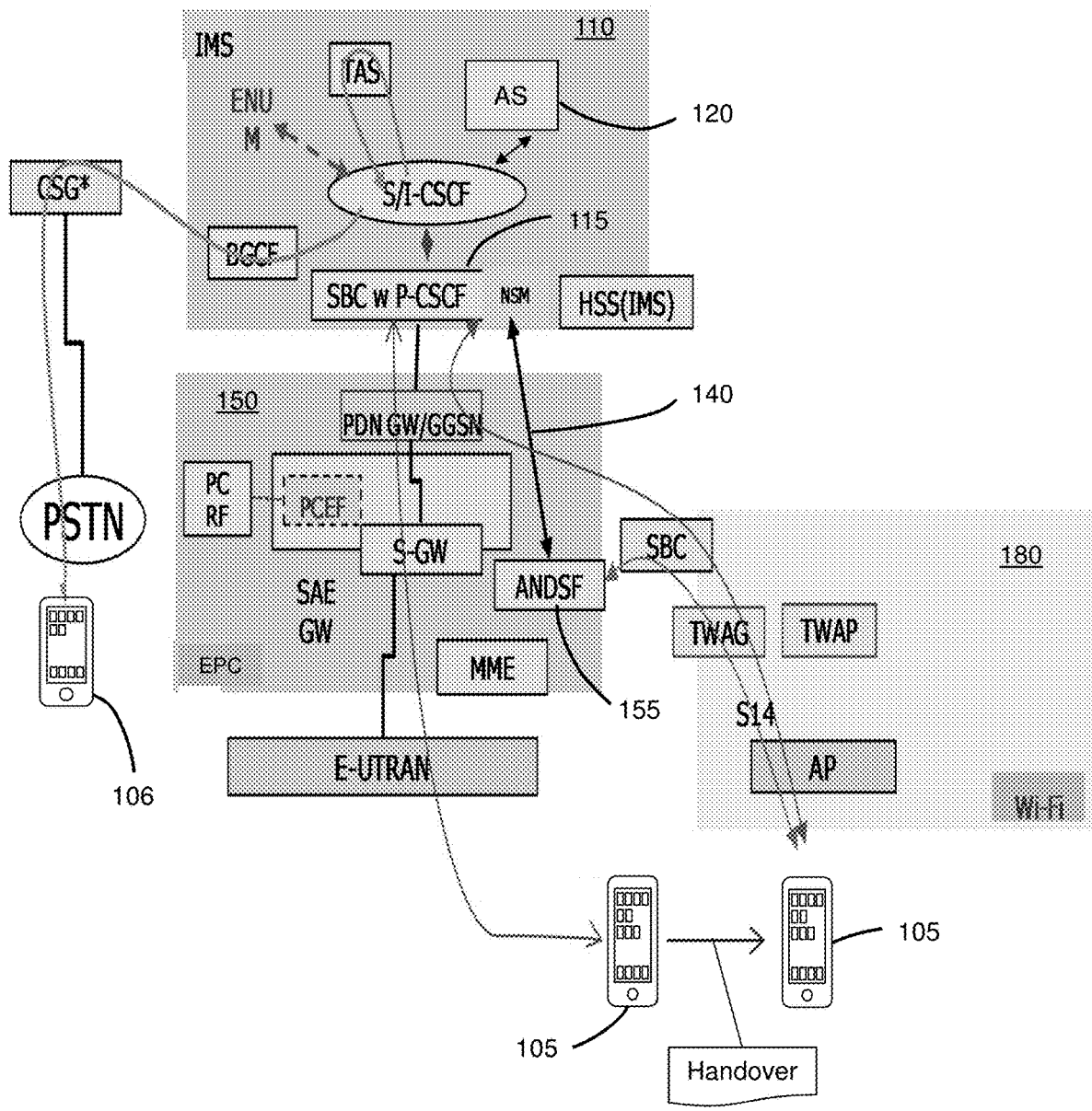
FIG. 1 depicts an illustrative embodiment of a communication system that distributes radio access information.

The subject disclosure describes, among other things, illustrative embodiments for providing information to an Access Network Discovery and Selection Function (ANDSF) by selectively bypassing the S14 interface between the ANDSF and an end user device. Existing communication paths, such as Session Initiation Protocol (SIP) signaling, can be used for delivering or otherwise exchanging information with the ANDSF. In one or more embodiments, the ANDSF can be a stand-alone device. Other embodiments are described in the subject disclosure.

In one or more embodiments, an indirect interface, such as via SIP signaling through the IMS network, can be used in addition to or in place of communications (e.g., via S14 interface) between the end user device and the ANDSF, Packet Data Network and IMS service network policy servers with established SIP session signaling and NSM.

One or more of the exemplary embodiments describe replacing or supplementing the S14 interface with the SIP signaling (or other signaling). The exemplary embodiments can replace or supplement various interfaces between the end user device and the ANDSF. The exemplary embodiments can replace or supplement various interfaces between the end user device and wireless network and IMS network policy servers.

One or more of the exemplary embodiments can supplement or replace communication over the S14 interface with communication via SIP signaling. For example, an end user device initiates a registrar process when the phone first turns on, as well as when a user initiates an IP Multimedia Subsystem (IMS) service (e.g., Voice-over-IP (VoIP) or video communication) on an access network such as Long Term Evolution (LTE) or WiFi. Information (e.g., radio access information such as describing neighboring cells) that is typically shared with an ANDSF by setting up an S14 interface can be included in SIP signaling to the IMS network which is already in place and being used. This information can be further sent from a Network Selection Manager (NSM) to the ANDSF resulting in a reduction of traffic between the end user device and the ANDSF over the S14 interface.

One or more of the exemplary embodiments can utilize the established connection between the IMS network and the ANDSF to enable Application Servers (AS) in Common Architecture for Real-Time Services (CARTS) to directly (e.g., via the NSM) communicate with the ANDSF for both getting feedback on changing parameters (such as bandwidth and other domain specific features for dynamic transcoding) and for content adaptation. The communication between the IMS network and the ANDSF can also enable the AS to enforce policies to the end user device via the ANDSF, such as priority services.

One or more of the exemplary embodiments can add application intelligence in supported services including enabling content adaptation, dynamic transcoding (codec, content limitation, and so forth). One or more of the exemplary embodiments can provide the ability to enforce and/or supplement additional service related policies such as priority services and/or premium services. One or more of the exemplary embodiments can provide an alternate or supplementary line of communication between the ANDSF and the end user device such as via SIP signaling. One or more of the exemplary embodiments can provide the ability to reserve resources in an access network, (e.g., in a WiFi network) via a Proxy Call Session Control Function (P-CSCF) directly communicating with the end user device, such as in a hotspot 2.0 environment.

One embodiment of the subject disclosure is a method that includes receiving, by a system including a processor, a session initiation message from a mobile communication device, where the session initiation message includes radio access information. The method can include providing, by the system, the radio access information to a server without utilizing an S14 interface to enable the server to discover access networks in proximity to the mobile communication device and to enable the server to manage connections to the access networks. The providing of the radio access information can be responsive to a determination to reduce network traffic associated with the S14 interface.

One embodiment of the subject disclosure includes a machine-readable storage device, including executable instructions that, when executed by a processor, facilitate performance of operations. The operations can include facilitating establishing an interface between the processor and a server, where the interface does not utilize an S14 interface, and where the server discovers access networks in proximity to a mobile communication device and manages connections to the access networks. The operations can include identifying a handover procedure between first and second access networks of the access networks for a single communication session of the mobile communication device, where the single communication session utilizes a first set of parameters for the first access network. The operations can include communicating a change in session parameters for the single communication session of the mobile communication device over the interface responsive to the identifying of the handover procedure. The communicating of the change in session parameters over the interface can cause the single communication session to utilize a second set of parameters for the second access network.

One embodiment of the subject disclosure includes a communication device with a processor and a memory that stores executable instructions that, when executed by the processor, facilitate performance of operations. The operations can include detecting a request for communication services and, responsive to the detecting of the request, providing radio access information to a first server of an IP multimedia subsystem network to cause the first server to establish an interface between the first server and a second server for providing the radio access information to the second server. The interface does not utilize an S14 interface. The providing of the radio access information is responsive to a determination to reduce network traffic associated with the S14 interface. The providing of the radio access information to the second server causes the second server to discover access networks in proximity to the communication device and to manage connections to the access networks.

FIG. 1 depicts an illustrative embodiment of a communication system 100 that includes an IMS network 110, an Evolved Packet Core (EPC) 150, and an access network 180 (e.g., a WiFi access network). The IMS network 110 enables combined services of circuit-switched and packet-switched systems. The EPC 150 enables support for, and mobility between, multiple heterogeneous access networks, such as E-UTRA (e.g., LTE and LTE Advanced air interface), 3GPP legacy systems (e.g., GERAN or UTRAN, air interfaces of GPRS and UMTS), and non-3GPP systems (e.g., WiFi, WiMAX and cdma2000). In this example of FIG. 1, a call flow is depicted which is an LTE origination call flow to the mobile communication device 106 operating on the PSTN and includes a handover to a WiFi access network. However, the exemplary embodiments can be applied to various networks utilizing various communication protocols described herein and/or can be applied to various types of communication services (e.g., voice, video, data and/or messaging).

In this example, establishing the original call can include device 105 sending a SIP INVITE message to P-CSCF 115 and the P-CSCF forwarding the SIP INVITE message to the Serving Call Session Control Function (S-CSCF). The S-CSCF can check the Initial Filter Criteria (iFC) for device 105 for originating processing. The S-CSCF can determine that it needs to invoke SCC-AS processing then the S-CSCF can send the SIP INVITE message to the SCC-AS (e.g., the first route header contains SCC-AS information and the second route header contains S-CSCF itself). After the SCC-AS processing, the SCC-AS can act as a Back-To-Back User Agent (B2BUA) and can send the SIP INVITE message back to the S-CSCF (as defined in second route header). Based on the iFC for device 105, a Telephony Application Server (TAS) can be invoked as the second AS for originating processing. The S-CSCF can send the SIP INVITE message to the TAS (e.g., first route header contains TAS information and second route header contains S-CSCF itself). After the TAS finishes its processing, it can act as the B2BUA and can send the call back to the S-CSCF (as defined in second route header). Based on the iFC for device 105, there may be no more AS that needs to be invoked for originating processing. The S-CSCF can perform an ENUM query. The ENUM can return with a negative response or only a Tel URI. The S-CSCF can route the call to the BGCF. The BGCF can perform an LNP dip and can send the SIP INVITE message to the appropriate CSG. The CSG can send an IAM to reach the terminating endpoint of device 106. A bearer path can be set up between device 105 and the SBC/P-CSCF (using IP), between the SBC/P-CSCF and CSG (using IP), and between the CSG and the device 106 (using PSTN). In one embodiment, if the device 106 is also in LTE coverage, LTE termination can be continued in the call termination part of the call flow. The media release may be performed at the SBC/P-CSCF and the voice bearer can be anchored at the PDN-GW/SAE-GW and not the SBC/P-CSCF.

Continuing with this example, the SIP INVITE message or other SIP signaling can include (e.g., in its payload) radio access information from the mobile communication device 105. The radio access information (delivered to the ANDSF via a direct interface 140) can enable or otherwise facilitate an Access Network Discovery and Selection Function (ANDSF) 155 to discover one or more access networks in a vicinity of the device 105 and/or provide rules or policies to prioritize services and/or manage connections to these access networks. The radio access information can be various types of information including data describing neighboring cells associated with a location of the mobile communication device 105. The radio access information can be extracted or otherwise obtained from the SIP signaling by a NSM of the P-CSCF 115 and delivered to the ANDSF 155 via the direct interface 140. In one embodiment, the direct interface 140 can be a connection established between the P-CSCF 115 and the ANDSF 155 that bypasses one or more elements of the access network 180 including one or more of a Session Border Controller (SBC), a Trusted Wireless Access Gateway (TWAG), a Trusted Wireless local area network (WLAN) Authentication, authorization and accounting (AAA) Proxy (TWAP) or a Wireless Access Point (WAP).

In one embodiment of system 100, an interface between Application Server (AS) 120 and the ANDSF 155 can be established where the interface does not utilize an S14 interface, and where the interface utilizes direct interface 140. The exemplary embodiments can replace or supplement various interfaces between the end user device and the ANDSF. In this example, a handover procedure between first and second access networks (e.g., between LTE and WiFi access networks) can be detected or otherwise predicted (e.g., based on a speed and/or direction of movement of device 105) for a single communication session of the mobile communication device 105. The single communication session can utilize a first set of parameters for the first access network, such as bandwidth, codec, transcoding type, and so forth. A change in session parameters according to the change in access networks can be communicated or otherwise exchanged over the interface, such as responsive to identifying or predicting the handover procedure. The communicating or exchanging of the change in session parameters over the interface can cause the single communication session to utilize a second set of parameters (e.g., an adjusted bandwidth, an adjusted latency, an adjusted packet loss, an adjusted codec, and/or an adjusted transcoding type) for the second access network. In one embodiment, the first set of parameters can be negotiated by the AS 120 responsive to an initiation of the single communication session by the mobile communication device 105. In one embodiment, the communicating of the change in session parameters over the interface causes an adjustment of a codec utilized for the single communication session. In one embodiment, the change in session parameters includes a bandwidth change, and the communicating of the change in session parameters over the interface enables content adaptation for the mobile communication device. In one embodiment, policy information can be communicated over the interface to enable the AS 120 to enforce a policy for prioritization of services at the mobile communication device 105. The exemplary embodiments can replace or supplement various interfaces between the end user device and wireless network and IMS network policy servers.

In one embodiment, system 100 provides for intelligent capability negotiation and content adaptation of services. For instance, when the AS 120 initiates an IMS service with the device 105, there can be certain capability parameter negotiations and agreements on resources and sets of parameters that are optimum or desired for that environment (i.e., access network), such as the bandwidth and codec being used for the streaming of video for a video chat service would be set for that specific domain. When the device 105 moves to a new domain (e.g., from LTE to WiFi), the network connectivity might change but the communication session would be relying on the same initial negotiated resource parameters even though the underlying network has changed. System 100 leverages the ongoing communication between the IMS network 110 and the ANDSF 155, so that the AS 120 in the IMS network can intelligently and dynamically change its capability parameters as a part of the handover procedure. This can give a content adaptation and/or dynamic transcoding ability to services offered from CARTS cloud.

When the device 105 initiates or starts, the device 105 can perform a SIP registration as part of startup sequences before going to idle waiting for service startup, such as VoIP or other IMS services. This means there is a signaling communication path between device 105 and the IMS network 110. Device 105 can be programmed to communicate RAT information to the P-CSCF 115 which forwards the RAT information to the ANDSF 155 via the NSM. System 100 through use of interface 140 can reduce or supplement the communication traffic on the S14 interface between the ANDSF 155 and the device 105. In one embodiment, system 100 can perform service-related policy provisioning/enforcement. In this example, a user of device 105 (such as reporter in a disaster area) can initiate a high priority service and the access network can accommodate the higher priority session for the given service in an optimum domain (such as by keeping the high-priority session in LTE during a congested network). When a secondary priority service in the same location (e.g., a video link to a surgery room) is running simultaneously and demands a higher bandwidth in midsession, the AS 120 in CARTS can communicate with the ANDSF 155 and other network resource management elements to change priority and/or policies of currently running services via communicating directly through the NSM and the direct interface 140.

Figure 2:
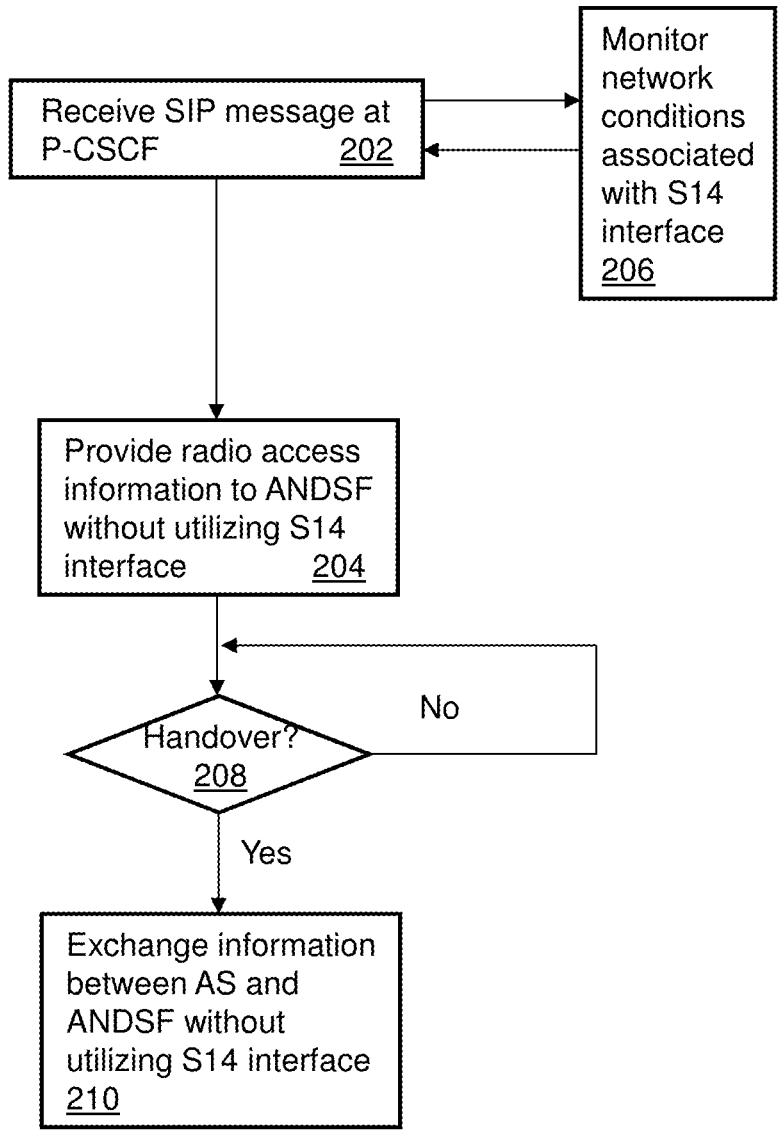
FIG. 2 depicts an illustrative embodiment of a method used in portions of the system described in FIG. 1.

FIG. 2 depicts an illustrative embodiment of a method 200 that can be used by system 100 or other communication systems. Method 200 can begin at 202 with radio access information being provided from an end user device, such as mobile communication device 105, to a network processor such as a network server that includes the NSM located in the P-CSCF 115 of the IMS network 110. The radio access information can be various types of information, such as data associated with neighboring cells, as well as other information that facilitates discovery of an access network(s) in the vicinity of the mobile communication device 105 and/or facilitates providing rules and/or policies to prioritize services and/or manage connections to the access network(s). In one embodiment, the radio access information can be delivered to the P-CSCF 115 via a session initiation message from the mobile communication device 105, such as being included in the payload of a SIP registration message or other SIP signaling from the mobile communication device to the P-CSCF. The exemplary embodiments can include the radio access information being otherwise included in SIP signaling, such as included in a header or other field of the message. In one embodiment, the providing of the radio access information can be in response to a startup sequence of the mobile communication device 105, for example, where the mobile communication device does a SIP registration as a part of startup sequences before going to idle waiting for service startup, such as VoIP and/or other IMS services.

At 204, the radio access information can be provided to a server (e.g., ANDSF 155) to enable the server to discover an access network(s) in proximity to the mobile communication device 105 and/or to enable the server to prioritize services and/or manage connections to the access network(s). In this embodiment, the radio access information or a portion thereof is provided to the server without being transmitted over an S14 interface between the server and the mobile communication device 105. The exemplary embodiments can replace or supplement various interfaces between the end user device and the ANDSF. The exemplary embodiments can replace or supplement various interfaces between the end user device and wireless network and IMS network policy servers. As an example, the server can include the ANDSF 155 and the direct interface 140 can be established between the P-CSCF 115 and the ANDSF 155. As explained herein, a direct interface can include network elements between the source and recipient devices (e.g., the P-CSCF 115 and the ANDSF 155) where the network elements facilitate traffic flow, such as routers and switches. The direct interface in this example between the P-CSCF 115 and the ANDSF 155 can exclude or otherwise bypass the S14 interface, session border controllers of the access network(s), the TWAG of the access network 180, the TWAP of the access network 180, and/or the WAP of the access network 180. In one embodiment, network conditions associated with the S14 interface (or with establishing a potential S14 interface) can be monitored. The network conditions can include network traffic (e.g., associated with the ANDSF, and/or elements of the access network 180 including one or more of the SBC, the TWAG, the TWAP, the WAP, and so forth), network element resource usage (e.g., usage of the ANDSF, and/or elements of the access network 180 including one or more of the SBC, the TWAG, the TWAP, the WAP, and so forth), historical network traffic (e.g., past traffic associated with the ANDSF, and/or elements of the access network 180 including one or more of the SBC, the TWAG, the TWAP, the WAP, and so forth), historical network element resource usage (e.g., past usage of the ANDSF, and/or elements of the access network 180 including one or more of the SBC, the TWAG, the TWAP, the WAP, and so forth), and/or signal quality. One or more of these network conditions can be analyzed resulting in a determination to reduce the network traffic associated with the S14 interface which can trigger the use of steps 202 and 204 to bypass the S14 interface in delivering the radio access information (or other information such as information associated with AS 120) to the ANDSF 155.

In one embodiment at 208, monitoring for a handover between additional access networks (such as between an LTE network and a WiFi network) can be performed. If a handover occurs then at 210, information can be exchanged between the AS 120 and the ANDSF 155 without utilizing the S14 interface. The exchanged information can enable application level intelligence for services being provided to the mobile communication device 105 including mid-session continuity, content adaptation and/or codec re-negotiation. In this embodiment, the exchange of information between the AS 120 and the ANDSF 155 allows a communication session to be improved according to a change in access networks, such as adjusting a first set of negotiated parameters (e.g., one or more of codec, bandwidth, resources, and so forth) to a second set of parameters (e.g., one or more of codec, bandwidth, resources, and so forth) that are more suited for the particular environment (i.e., the new access network following the handover procedure).

As an example, a change to session parameters can be communicated or otherwise exchanged without utilizing the S14 interface (e.g., via the direct interface 140) responsive to the handover procedure where the change to session parameters comprises a bandwidth change, and where the exchange of the change to session parameters enables content adaptation for the mobile communication device 105. In another embodiment, the AS 120 and the ANDSF 155 can communicate policy information without utilizing the S14 interface (e.g., via the direct interface 140) to enable the AS 120 to enforce a policy for prioritization of services at the mobile communication device 105. The exchange of information between the AS 120 and the ANDSF 155 can be for a single communication session of the mobile communication device 105 where different access networks are being used during the session.

In one embodiment, a direct interface (e.g., interface 140) between the P-CSCF 115 and the ANDSF 155 can be used in conjunction with an S14 interface. For example, the route for delivering information (i.e., the direct interface 140 or the S14 interface) can be selected based on a number of factors including network conditions, type of information, type of service(s) being rendered to the mobile communication device 105, quality of service parameters and/or thresholds, and so forth. In one embodiment, the information or a portion thereof can be transmitted over both the direct interface 140 and the S14 interface, such as to provide redundancy of delivery.

One or more of the exemplary embodiments can provide various communication services including voice, video, data and/or messaging services. The exemplary embodiments can be directed to or otherwise used in conjunction with various types of access networks and/or various types of systems for providing communication services such as interactive television systems including an Internet Protocol Television (IPTV) media system, a satellite broadcast television system, analog or digital cable broadcast distribution system, and so forth. For example, the IPTV media system can include a super head-end office (SHO) with at least one super headend office server (SHS) which receives media content from satellite and/or terrestrial communication systems. In the present context, media content can represent, for example, audio content, moving image content such as 2D or 3D videos, video games, virtual reality content, still image content, and combinations thereof. The SHS server can forward packets associated with the media content to one or more video head-end servers (VHS) via a network of video head-end offices (VHO) according to a multicast communication protocol.

The VHS can distribute multimedia broadcast content via an access network to commercial and/or residential buildings housing a gateway (such as a residential or commercial gateway). The access network can represent a group of digital subscriber line access multiplexers (DSLAMs) located in a central office or a service area interface that provide broadband services over fiber optical links or copper twisted pairs to buildings. The gateway can use communication technology to distribute broadcast signals to media processors such as Set-Top Boxes (STBs) which in turn present broadcast channels to media devices such as computers or television sets managed in some instances by a media controller (such as an infrared or RF remote controller). The gateway, the media processors, and media devices can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors and subsystems of the IPTV media system for services such as video-on-demand (VoD), browsing an electronic programming guide (EPG), or other infrastructure services.

The satellite broadcast television system can utilize signals transmitted by a satellite that include media content and which can be received by a satellite dish receiver coupled to the building. Modulated signals received by the satellite dish receiver can be transferred to the media processors for demodulating, decoding, encoding, and/or distributing broadcast channels to the media devices. The media processors can be equipped with a broadband port to an Internet Service Provider (ISP) network to enable interactive services such as VoD and EPG as described above. The analog or digital cable broadcast distribution system such as a cable TV system can provide Internet, telephony, and interactive media services. The exemplary embodiments can apply to other present or next generation over-the-air and/or landline media content services system.

Multiple forms of media services can be offered to media devices over landline technologies such as those described above. Additionally, media services can be offered to media devices by way of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 3:
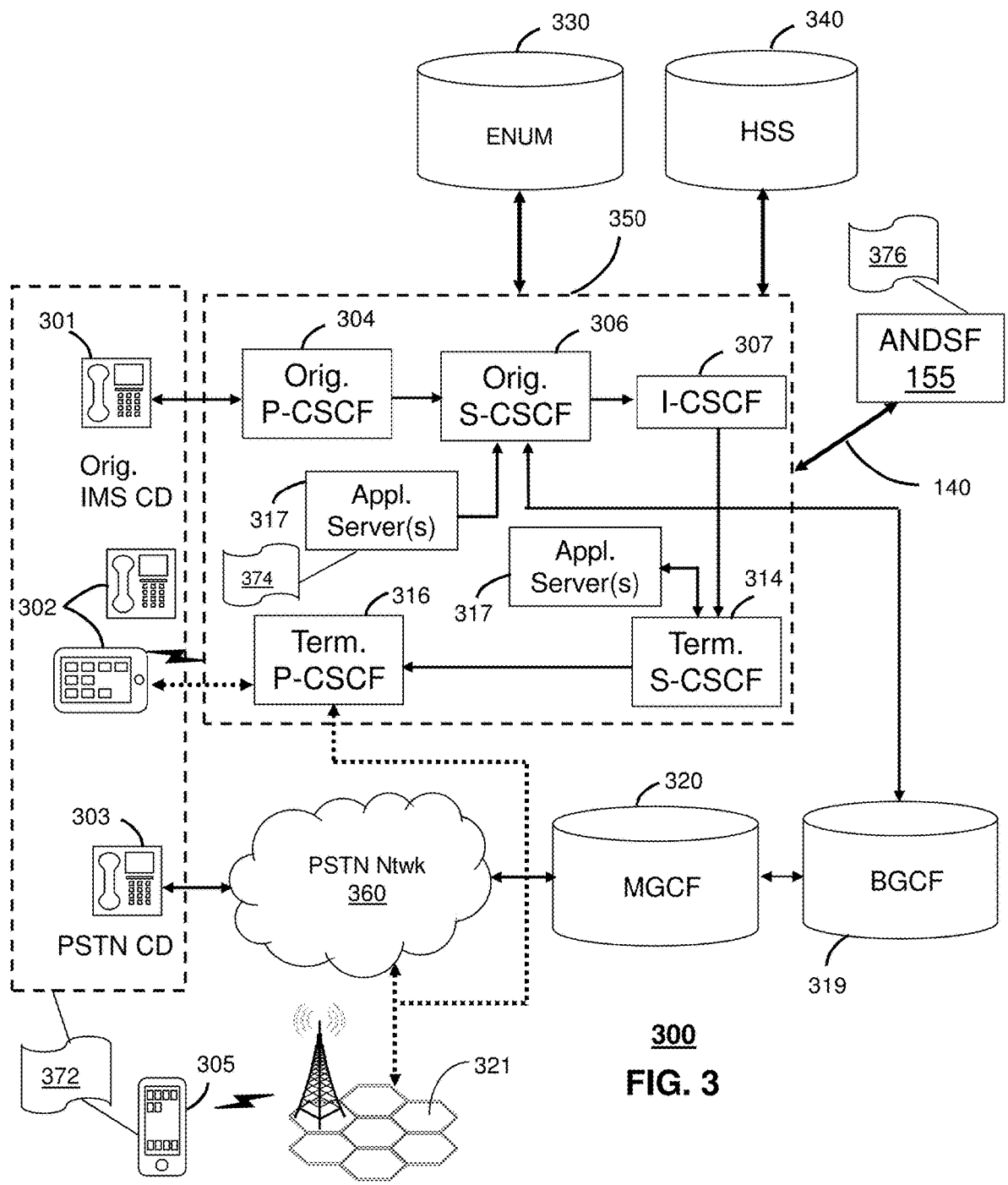
FIG. 3 depicts an illustrative embodiment of communication system that provides media services and distributes radio access information.

FIG. 3 depicts an illustrative embodiment of a communication system 300 employing an IMS network architecture to facilitate the combined services of circuit-switched and packet-switched systems. Communication system 300 can be overlaid or operably coupled with system 100 as another representative embodiment of communication system 300. System 300 provides for the direct interface 140 between an IMS network 350 and the ANDSF 155. The exemplary embodiments can replace or supplement various interfaces between the end user device and wireless network and IMS network policy servers. Interface 140 can be utilized to alleviate network traffic associated with an S14 interface and/or to enable application servers to provide mid-session continuity, codec negotiation, content adaptation, and so forth, such as responsive to a handover between access networks or responsive to a change in network conditions. The exemplary embodiments can replace or supplement various interfaces between the end user device and the ANDSF. Interface 140 further allows application servers to enforce and/or supplement additional service related policies such as priority services and/or premium services. Interface 140 additionally enables the ANDSF 155 to dynamically receive session parameter information (from the application servers, from the end user devices and/or from other network elements) so that the communication session can be updated according to changing conditions associated with the session, such as a change in network capabilities causes by a handover from a first access network to a second access network.

Communication system 300 can comprise a Home Subscriber Server (HSS) 340, a tElephone NUmber Mapping (ENUM) server 330, and other network elements of an IMS network 350. The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF) which communicates with an interrogating CSCF (I-CSCF), which in turn, communicates with a Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit the SIP INVITE message to one or more application servers (ASs) 317 that can provide a variety of services to IMS subscribers. As explained herein the SIP INVITE message or other SIP signaling can include information that enables the ANDSF to perform various functions including discovering access networks in the vicinity of the end user device and/or providing rules and/or policies to prioritize services and/or manage connections to these access networks.

For example, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing. In addition, communication system 300 can be adapted to provide the IMS CDs 301, 302 with the multimedia and Internet services of communication system 100 of FIG. 1.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

CDs 301, 302, 303 and 305 can be adapted with software to perform function 372 to utilize the services of the ANDSF 155 and the services of AS 317. Function 372 can include communicating radio access information to the ANDSF 155 via the IMS network 350 without utilizing (or in addition to utilizing) an S14 interface. The radio access information can be various types of information that enable the ANDSF to perform functions 376 including discovering access network(s) in the vicinity of the end user devices, utilizing rules and/or policies to prioritize services and/or manage connections to the access networks. System 300 also provides the AS(s) 317 with the ability to perform functions 374 which include communicating with the ANDSF 155 (such as mid-session including responsive to a handover event or a change in parameters of an access network) to enable various processes including consideration of Application Layer Performance criteria, and/or consideration of user preferences (such as to establish mid-session continuity), codec re-negotiation, and/or content adaptation. In one embodiment, system 300 provides for layer-7 communications between the ANDSF 155 and the IMS network to enable Application Level Intelligence for allowing the ANDSF to promptly communicate with the IMS and the AS(s) 317 in order to accommodate mid-session continuity, content adaptation, codec negotiation, and other functions that are responsive to a handover between access networks or responsive to a change in network parameters.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 4:
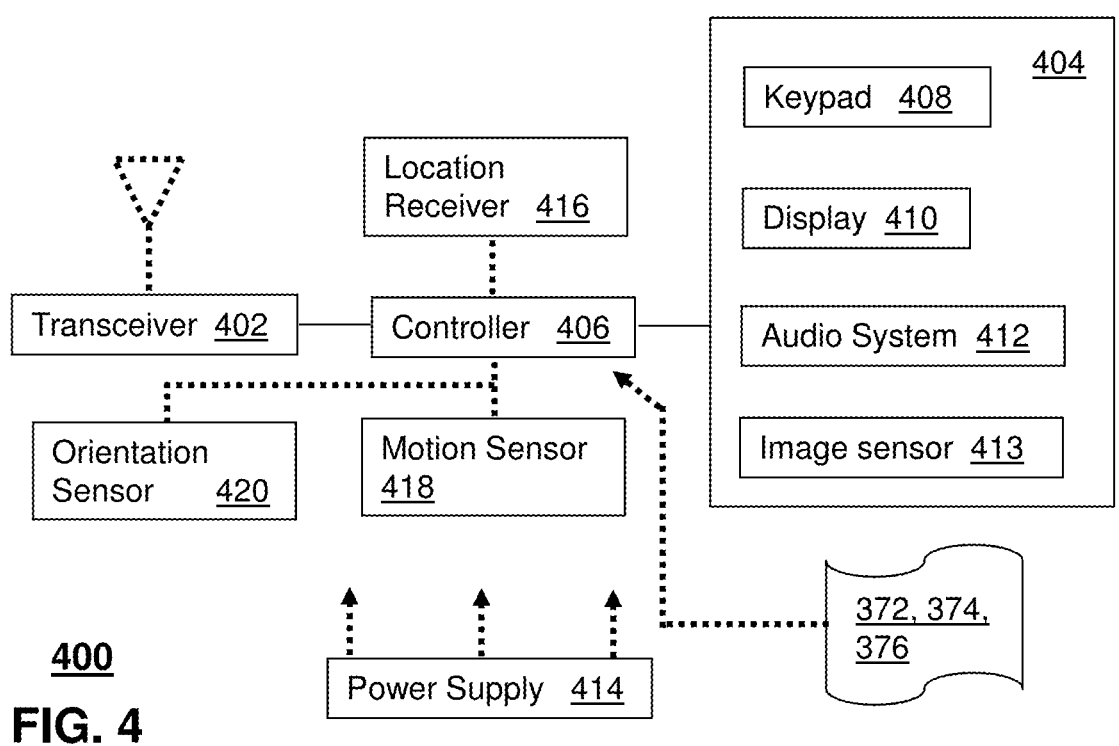
FIG. 4 depicts an illustrative embodiment of a communication device that can operate in the systems of FIGS. 1 and 3.

FIG. 4 depicts an illustrative embodiment of a communication device 400. Communication device 400 can serve in whole or in part as an illustrative embodiment of the devices depicted in FIGS. 1 and/or 3 including end user devices, network elements, third party servers, and so forth. Communication device 400 in whole or in part can represent any of the communication devices described in FIGS. 1 and 3 and can be configured to perform all or portions of method 200 of FIG. 2, as well as functions 372, 374 and/or 376. Communication device 400 can also be configured to perform steps or functions described with respect to the exemplary embodiments while specifically excluding performing other steps or functions described with respect to the exemplary embodiments.

In one or more embodiment, communication device 400 can detect a request for communication services and, responsive to the detecting of the request, can provide radio access information to a first server of an IP multimedia subsystem network to cause the first server to establish an interface between the first server and a second server for providing the radio access information to the second server, where the interface does not utilize an S14 interface, where the providing of the radio access information is responsive to a determination to reduce network traffic associated with the S14 interface, and where the providing of the radio access information to the second server causes the second server to discover access networks in proximity to the communication device and to manage connections to the access networks. In one embodiment, the providing of the radio access information to the first server is via a session initiation protocol message transmitted from the communication device to the first server (such as in a payload of the SIP message. In one embodiment, the radio access information can include data associated with neighboring cells according to a location of the communication device. In one embodiment, the first server can include a proxy call session control function, and the second server can include an access network discovery and selection function. In one embodiment, policy information can be communicated over the interface to enable an application server of the IP multimedia subsystem network to enforce a policy for prioritization of services at the communication device. The exemplary embodiments can replace or supplement various interfaces between the end user device and wireless network and IMS network policy servers.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of devices of FIGS. 1 and/or 3. It will be appreciated that the communication device 400 can also represent other devices that can operate in systems of FIGS. 1 and/or 2 such as a gaming console and a media player. In addition, the controller 406 can be adapted in various embodiments to perform the functions 372, 374 and/or 376.

Upon reviewing the aforementioned embodiments, it would be evident to an artisan with ordinary skill in the art that said embodiments can be modified, reduced, or enhanced without departing from the scope of the claims described below. For example, the selection of the routing path (i.e., via the IMS network or via the S14 interface) can be based on the type of information that is being provided (e.g., data associated with neighboring cells of the end user device), faults or other undesired conditions detected with respect to network elements that are predicted to be along the S14 interface, the type of communication session (e.g., a voice call vs. a video conference), subscriber agreements for quality of service thresholds, and so forth. In one embodiment, a separate network element can analyze SIP messaging (including analyzing payloads and/or headers) to identify radio access information that should be forwarded to the ANDSF 155. Based on a detection of the radio access information, a direct interface between the separate network element and the ANDSF 155 can be established for delivery of the radio access information. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
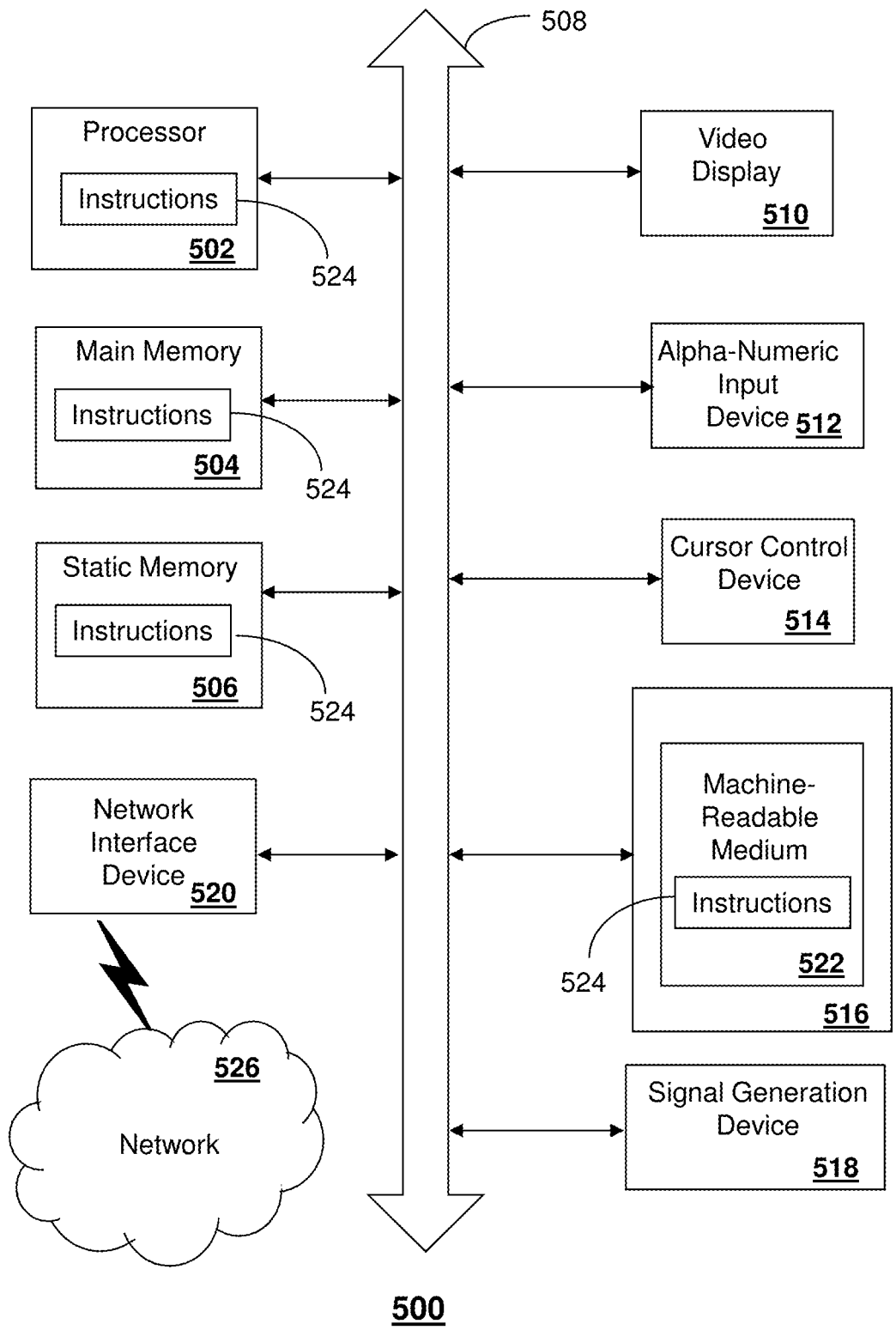
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the end user device 105, the NSM or P-CSCF 115, the AS 120, the ANDSF 155 and so forth to facilitate delivery of information to enable discovering access network(s) in the vicinity of the end user device and/or providing rules and/or policies to prioritize services and/or manage connections to the access networks.

In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    obtaining, by a processing system of an internet protocol multimedia subsystem (IMS) network, the processing system including a processor, a session initiation protocol (SIP) message from a mobile communication device via a packet core of a wireless network, wherein the SIP message includes radio access information;
    forwarding, by the processing system, the radio access information toward an access network discovery and selection function (ANDSF) of the packet core, via an interface between the IMS network and the ANDSF; and
    sending, by the processing system, policy information over the interface between the IMS network and the ANDSF to provision a policy for prioritization of services at the mobile communication device.

2. The method of claim 1, wherein the interface between the IMS network and the ANDSF comprises a connection between a proxy call session control function (P-CSCF) of the IMS network and the ANDSF.

3. The method of claim 1, wherein the obtaining the SIP message is responsive to an initiation of a registration procedure by the mobile communication device for accessing a communication service of the IMS network.

4. The method of claim 1, wherein the processing system comprises an application server of the IMS network.

5. The method of claim 1, wherein the radio access information is forwarded responsive to a determination to reduce network traffic associated with an interface between the mobile communication device and the packet core.

6. The method of claim 5, wherein the processing system and the ANDSF communicate a change to session parameters without utilizing the interface between the mobile communication device and the packet core responsive to a handover procedure for the mobile communication device.

7. The method of claim 6, wherein the change to session parameters comprises a bandwidth change.

8. The method of claim 6, wherein the change to session parameters enables content adaptation for the mobile communication device.

9. The method of claim 1, wherein the forwarding the radio access information enables the packet core to discover an access network in proximity to the mobile communication device.

10. The method of claim 9, wherein the forwarding the radio access information enables the packet core to manage a connection to the access network.

11. A device comprising:
    a processing system for an application server of an internet protocol multimedia subsystem (IMS) network, the processing system including a processor; and
    a memory that stores executable instructions that, when executed by the processing system, facilitate performance of operations comprising:
        obtaining a session initiation protocol (SIP) message from a mobile communication device via a packet core of a wireless network, wherein the SIP message includes radio access information;
        forwarding the radio access information toward an access network discovery and selection function (ANDSF) of the packet core, via an interface between the IMS network and the ANDSF, wherein forwarding the radio access information enables the packet core to discover an access network in proximity to the mobile communication device; and sending policy information over the interface between the IMS network and the ANDSF to provision a policy for prioritization of services at the mobile communication device.

12. The device of claim 11, wherein the interface between the IMS network and the ANDSF comprises a connection between a proxy call session control function (P-CSCF) of the IMS network and the ANDSF.

13. The device of claim 11, wherein the obtaining the SIP message is responsive to an initiation of a registration procedure by the mobile communication device for accessing a communication service of the IMS network.

14. The device of claim 11, wherein the radio access information is forwarded responsive to a determination to reduce network traffic associated with an interface between the mobile communication device and the packet core.

15. The device of claim 14, wherein the application server and the ANDSF communicate a change to session parameters without utilizing the interface between the mobile communication device and the packet core responsive to a handover procedure for the mobile communication device.

16. The device of claim 15, wherein the change to session parameters comprises a bandwidth change.

17. The device of claim 15, wherein the change to session parameters enables content adaptation for the mobile communication device.

18. A non-transitory machine-readable medium comprising executable instructions that, when executed by a processing system for an application server of an internet protocol multimedia subsystem (IMS) network, the processing system including a processor, facilitate performance of operations comprising:

obtaining a session initiation protocol (SIP) message from a mobile communication device via a packet core of a wireless network, wherein the SIP message includes radio access information, wherein the obtaining the SIP message is responsive to an initiation of a registration procedure by the mobile communication device for accessing a communication service of the IMS network;

forwarding the radio access information toward an access network discovery and selection function (ANDSF) of the packet core, via an interface between the IMS network and the ANDSF, wherein forwarding the radio access information enables the packet core to discover an access network in proximity to the mobile communication device; and sending policy information over the interface between the IMS network and the ANDSF to provision a policy for prioritization of services at the mobile communication device.

19. The non-transitory machine-readable medium of claim 18, wherein the interface between the IMS network and the ANDSF comprises a connection between a proxy call session control function (P-CSCF) of the IMS network and the ANDSF.

20. The non-transitory machine-readable medium of claim 18, wherein the radio access information is forwarded responsive to a determination to reduce network traffic associated with an interface between the mobile communication device and the packet core.

* * * * *